(12) United States Patent
Tanabe et al.

(10) Patent No.: US 9,891,616 B2
(45) Date of Patent: Feb. 13, 2018

(54) NUMERICAL CONTROLLER WITH DNC OPERATION FUNCTION USING A PLURALITY OF COMMUNICATION LINES

(71) Applicant: FANUC Corporation, Minamitsuru, Yamanashi (JP)

(72) Inventors: Masaki Tanabe, Minamitsuru-gun (JP); Shogo Inoue, Minamitsuru-gun (JP)

(73) Assignee: FANUC Corporation, Minamitsuru-gun, Yamanshi (JP)

( * ) Notice: Subject to any disclaimer, the term of this patent is extended or adjusted under 35 U.S.C. 154(b) by 384 days.

(21) Appl. No.: 14/834,544

(22) Filed: Aug. 25, 2015

(65) Prior Publication Data
US 2016/0085233 A1    Mar. 24, 2016

(30) Foreign Application Priority Data

Sep. 22, 2014 (JP) ................. 2014-192859

(51) Int. Cl.
*G05B 19/18* (2006.01)
*G05B 19/408* (2006.01)
*G05B 19/418* (2006.01)

(52) U.S. Cl.
CPC ....... *G05B 19/408* (2013.01); *G05B 19/4181* (2013.01); *G05B 2219/31244* (2013.01); *G05B 2219/33101* (2013.01); *G05B 2219/39169* (2013.01); *Y02P 90/06* (2015.11)

(58) Field of Classification Search
CPC .............. G05B 19/408; G05B 19/4181; G05B 2219/33101; G05B 2219/31244; G05B 2219/39169; Y02P 90/06
See application file for complete search history.

(56) References Cited

U.S. PATENT DOCUMENTS 4,550,375 A * 10/1985 Sato ....................... B23Q 41/00
                                                        318/569
5,388,051 A *  2/1995 Seki ..................... G05B 19/408
                                                        700/169
(Continued)

FOREIGN PATENT DOCUMENTS

JP        51-018057 A     2/1976
JP      H03-212743 A     9/1991
(Continued)

OTHER PUBLICATIONS

Office Action dated Jul. 26, 2016 in Japanese Patent Application No. 2014-192859 (4 pages) with English translation (3 pages).

*Primary Examiner* — Ramesh Patel
(74) *Attorney, Agent, or Firm* — Drinker Biddle & Reath LLP (57) ABSTRACT

A numerical controller includes a numerical control unit, a DNC operation management unit, and first and second communication units. The first and second communication units receive the same NC program from a host through corresponding communication paths. The DNC operation management unit acquires the NC program from a reception data buffer included in one of the communication units to transfer the NC program to the numerical control unit, and when a failure occurs in the communication path used by the communication unit, an acquisition destination of the NC program is switched to a reception data buffer of the other communication unit.

4 Claims, 8 Drawing Sheets

(56) References Cited

U.S. PATENT DOCUMENTS

| | | | |
|---|---|---|---|
| 5,850,343 A * | 12/1998 | Nakamura | G05B 19/41835 700/112 |
| 5,946,215 A * | 8/1999 | Mito | G05B 19/409 700/169 |
| 6,438,444 B1 * | 8/2002 | Mizuno | G05B 19/41845 318/567 |
| 6,708,239 B1 * | 3/2004 | Ellerbrock | H04L 12/40032 710/62 |
| 7,035,710 B2 * | 4/2006 | Balling | G05B 19/4185 700/169 |
| 7,274,968 B1 * | 9/2007 | Toyonaga | G05B 19/414 318/569 |
| 7,617,330 B2 * | 11/2009 | Ellerbrock | G06F 13/385 709/220 |
| 8,856,345 B2 * | 10/2014 | Lahtinen | G05B 9/03 709/201 |
| 2005/0097165 A1 | 5/2005 | Lahtinen et al. | |
| 2011/0093666 A1 * | 4/2011 | Endo | G05B 19/4155 711/154 |
| 2014/0088755 A1 * | 3/2014 | Haga | G05B 19/408 700/190 |

FOREIGN PATENT DOCUMENTS

| | | |
|---|---|---|
| JP | H04-137008 A | 5/1992 |
| JP | H07-239707 A | 9/1995 |
| JP | 3230922 B2 | 11/2001 |
| JP | 2006-313559 A | 11/2006 |
| JP | 2007-026010 A | 2/2007 |

\* cited by examiner

NUMERICAL CONTROLLER WITH DNC OPERATION FUNCTION USING A PLURALITY OF COMMUNICATION LINES

RELATED APPLICATION DATA

This application claims priority under 35 U.S.C. § 119 and/or § 365 to Japanese Application No. 2014-192859 filed Sep. 22, 2014, the entire contents is incorporated herein by reference.

BACKGROUND OF THE INVENTION

Field of the Invention

The present invention relates to a numerical controller that can continue DNC operation even if a communication failure occurs during the DNC operation.

Description of the Related Art

A numerical controller usually performs machining by using an NC program stored in a storage medium (such as a non-volatile memory and an HDD) in the numerical controller. Meanwhile, a numerical controller connected to a communication line has a function of performing machining by using an NC program supplied from a host (computer that an FTP server, an HTTP server, and the like run on) through the communication line, without saving the NC program in the storage medium, not using the NC program stored in a storage medium. Such a method of operating a machine tool while transferring the NC program through a communication line or the like is called DNC operation.

In the DNC operation, the reception of the NC program from the host and the machining of a workpiece are performed at the same time. Therefore, when a communication failure occurs in the communication line between the numerical controller and the host, the numerical controller cannot receive the NC program, and the machining is stopped in the middle. If the machining is stopped in the middle, there is a problem that a cutter mark is made on the workpiece or that a vibration is generated. The communication failure needs to be solved to restart the machining, and there is a problem that the machining time becomes long due to the time required to solve the communication failure.

Figure 8A:
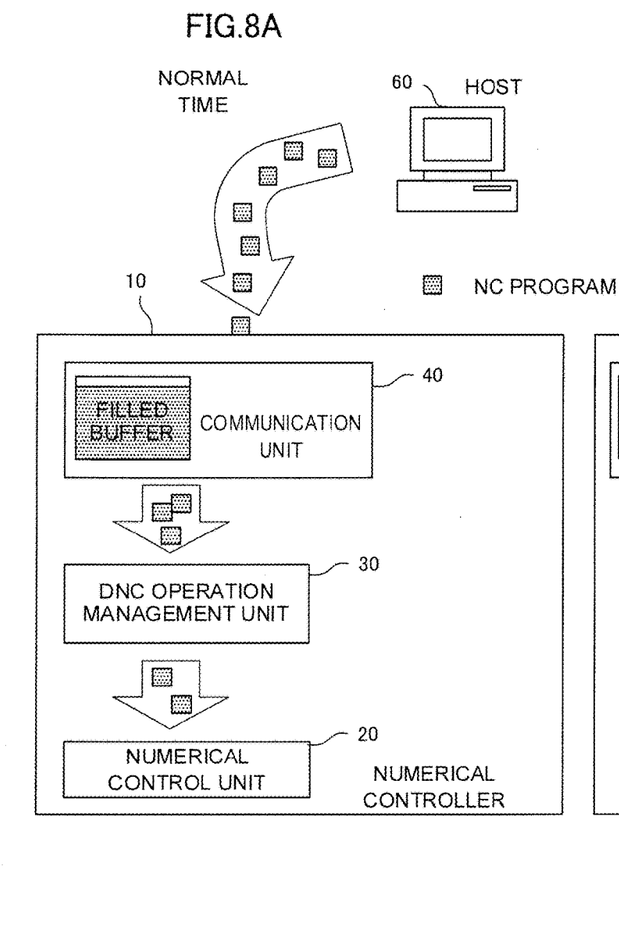
FIG. 8A is a diagram describing that a stop of machining can be avoided by using the NC program stored in a buffer even if a temporary communication failure occurs.

Therefore, as shown in FIG. 8A, a communication unit 40 in the DNC operation sequentially stores the NC program received by communicating with a host 60, in a buffer provided in the communication unit 40. A DNC operation management unit 30 supplies the NC program stored in the buffer in the communication unit 40 to a numerical control unit 20. Providing the buffer in the communication unit 40 can avoid the stop of machining when a communication failure occurs, because the NC program stored in the buffer can be used if the communication failure is a temporary failure.

Figure 8B:
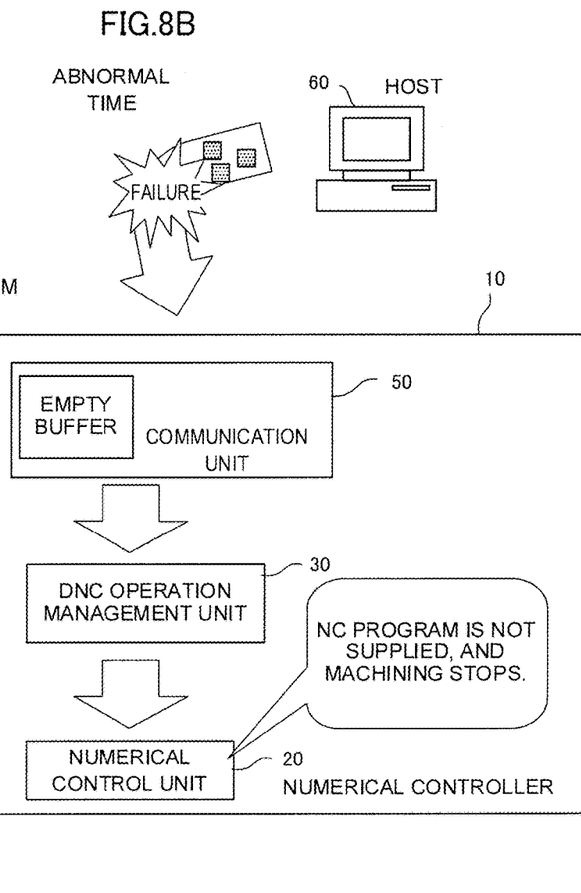
FIG. 8B is a diagram describing that the machining is stopped if a communication failure that makes the NC program in the buffer to be exhausted occurs.

The method of preparing the buffer in the numerical controller has a certain effect on a communication failure recovered in a very short time or on a temporary communication delay. However, when the communication failure or the communication delay is prolonged, the NC program in the buffer is exhausted as shown in FIG. 8B. The DNC operation management unit 30 cannot supply the NC program to the numerical control unit 20, and as a result, there is a problem that the machining is stopped.

A DNC operation method with a function of retracting a tool in cutting operation in an axial direction of the tool installation, in order to avoid the problem that a cutter mark is made on the workpiece or that a vibration is generated due to the stop of the reception of the NC program caused by the communication failure or the like, is well known as disclosed for example in Japanese Patent Application Laid-Open No. 7-239707. However, the DNC operation method is for reducing the influence when a communication failure occurs or the like and is not for solving the problem that the machining time becomes long when the communication failure is prolonged.

SUMMARY OF THE INVENTION

An object of the present invention is to provide a numerical controller including a mechanism of DNC operation more resistant to a communication failure compared to the conventional techniques and having a DNC operation function using a plurality of communication lines.

The present invention provides a numerical controller capable of DNC operation using an NC program acquired from a host through a communication path, the numerical controller including: a numerical control unit that controls a machine tool based on the NC program; a plurality of communication units that use different communication paths to receive the NC program; and a DNC operation management unit that supplies the NC program received by the communication units to the numerical control unit. Each of the plurality of communication units includes: a reception data buffer that stores the NC program; and an NC program reception unit that receives the NC program from the host to store the NC program in the reception data buffer. Meanwhile, the DNC operation management unit acquires the NC program from the reception data buffer included in one of the plurality of communication units to supply the NC program to the numerical control unit and includes a reception management unit that switches an acquisition destination of the NC program to the reception data buffer of another communication unit when a communication failure of the communication path used by the one of the plurality of communication units is detected.

At least one of the communication paths may be configured to use the Internet.

The plurality of communication units may receive the NC program from different hosts among at least two or more hosts.

The reception management unit may detect the communication failure of the communication path used by the communication unit based on a remaining amount of the NC program stored in the reception data buffer of the communication unit being an acquisition destination of the NC program.

The present invention can avoid the problem that a cutter mark is made on a workpiece or that a vibration is generated due to a stop of machining operation in the middle caused by a communication failure in DNC operation and can prevent a delay of machining time.

BRIEF DESCRIPTION OF THE DRAWINGS

These and other objects and features of the present invention will become apparent from the following description of embodiments with reference to the attached drawings. Among the drawings:

FIGS. 8A and 8B are diagrams describing a problem of DNC operation in a conventional technique, wherein

DETAILED DESCRIPTION OF THE PREFERRED EMBODIMENTS

Embodiments of the present invention will now be described with reference to the drawings. The same or similar components as in the description of the conventional techniques are designated with the same reference numerals.

A first embodiment of a numerical controller according to the present invention will be described with reference to FIGS. 1 to 5.

Figure 1:
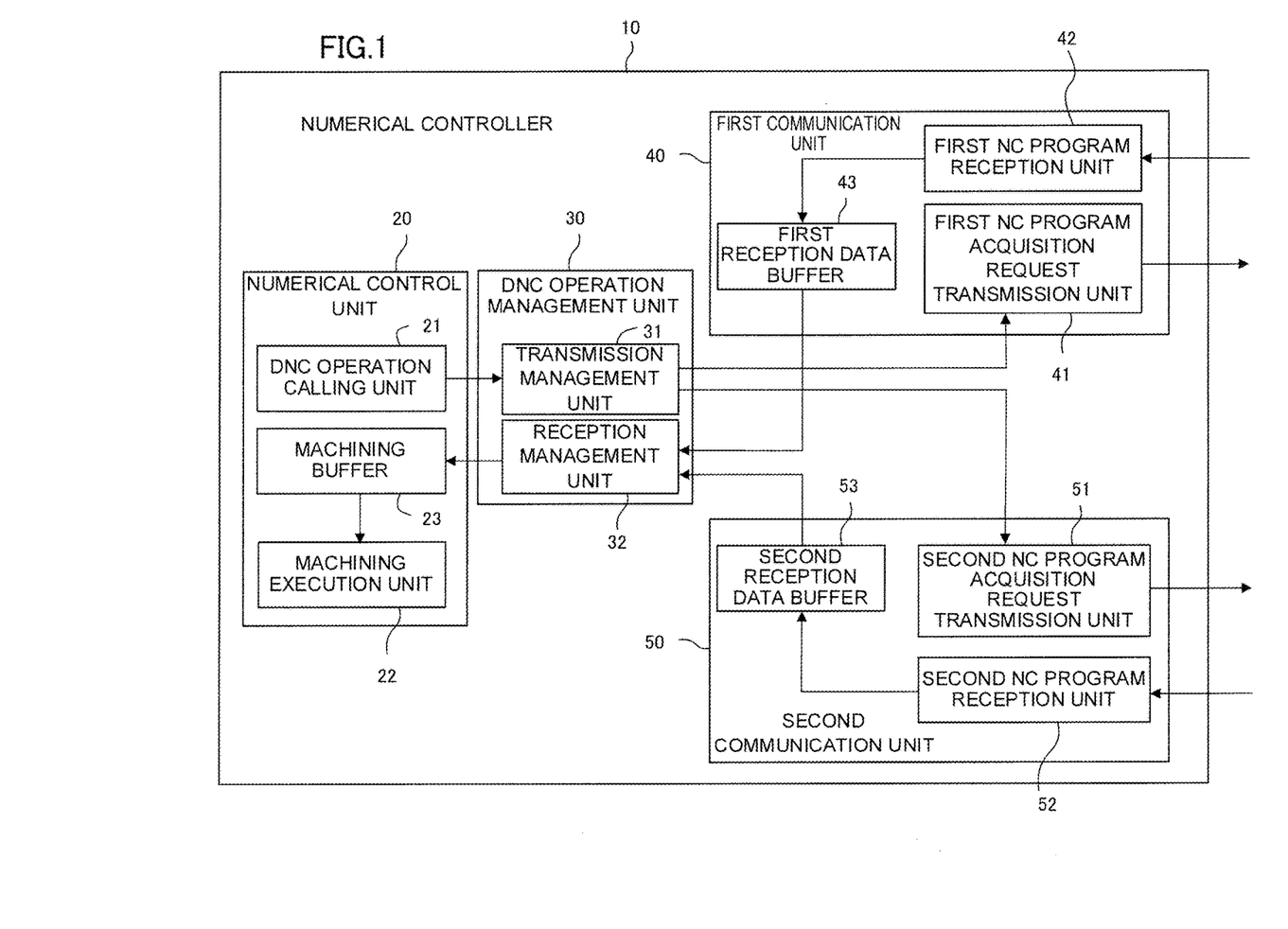
FIG. 1 is a block diagram of main parts of a first embodiment of a numerical controller according to the present invention.

FIG. 1 is a block diagram of main parts of the first embodiment of the numerical controller according to the present invention.

A numerical controller 10 includes a numerical control unit 20, a DNC operation management unit 30, a first communication unit 40, and a second communication unit 50.

The numerical control unit 20 includes a DNC operation calling unit 21, a machining execution unit 22, and a machining buffer 23 that temporarily stores an NC program used by the machining execution unit 22. In DNC operation, the DNC operation calling unit 21 requests a transmission management unit 31 of the DNC operation management unit 30 described later to transmit the NC program. The machining execution unit 22 instructs each component of the numerical controller 10 to control machining operation by a machine tool based on the NC program stored in the machining buffer 23.

The DNC operation management unit 30 includes a transmission management unit 31 and a reception management unit 32. The transmission management unit 31 receives the request of the NC program from the DNC operation calling unit 21, and the reception management unit 32 reads the NC program from a first reception data buffer 43 and a second reception data buffer 53 described later to supply the NC program to the machining buffer 23.

The first communication unit 40 includes a first NC program acquisition request transmission unit 41, a first NC program reception unit 42, and a first reception data buffer 43. The first NC program acquisition request transmission unit 41 receives the transmission request of the NC program from the transmission management unit 31 and requests a host 60 to transmit the NC program, the first NC program reception unit 42 receives the NC program from the host 60, and the first reception data buffer 43 stores the NC program received by the first NC program reception unit 42.

The second communication unit 50 includes a second NC program acquisition request transmission unit 51, a second NC program reception unit 52, and the second reception data buffer 53. The elements 51, 52, and 53 have the same functions as the corresponding elements 41, 42, and 43 of the first communication unit 40.

Figure 2:
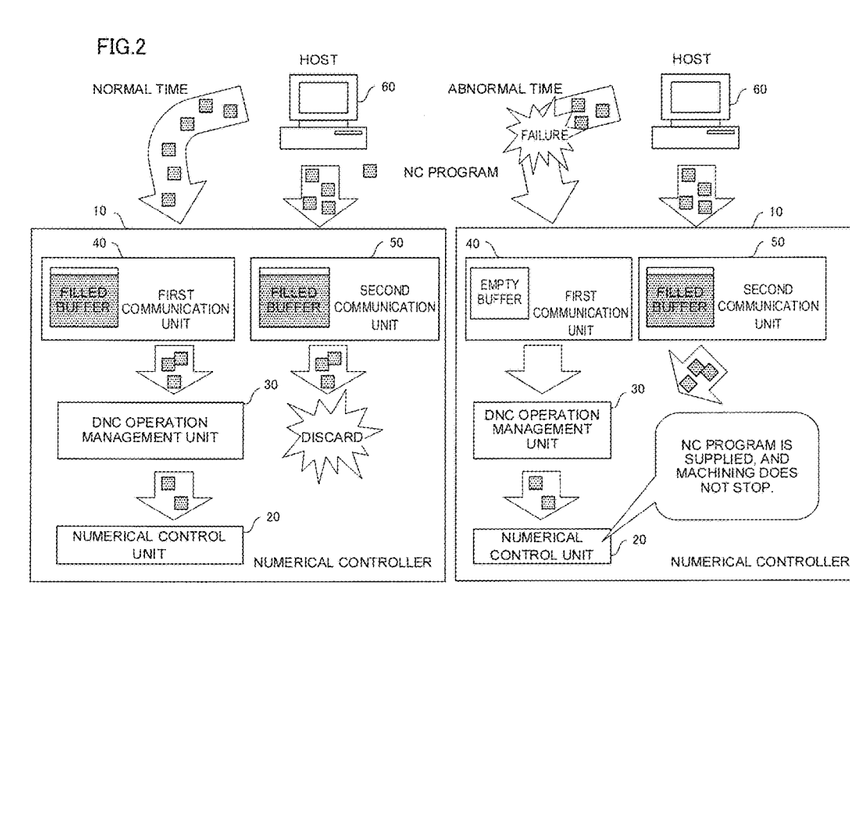
FIG. 2 is a diagram describing an outline of basic operation of DNC operation carried out on the numerical controller of FIG. 1.

FIG. 2 is a diagram describing an outline of basic operation of the DNC operation carried out on the numerical controller 10 of FIG. 1.

The first communication unit 40 and the second communication unit 50 in the numerical controller 10 access the same host 60 through different communication paths (for example, a path connected in a wired communication and a path connected in a wireless communication). More specifically, a plurality of communication units 40 and 50 independently request one host 60 to transmit the same NC program.

In response to the requests of the communication units 40 and 50, the host 60 transmits the NC program to the communication units 40 and 50 through different communication paths. The communication units 40 and 50 receive the NC program from the host 60 and store the NC program in buffers in the communication units. The DNC operation management unit 30 reads the NC program from the buffer of one of the communication units 40 and 50 and supplies the NC program to the numerical control unit 20. The DNC operation management unit 30 discards the part of the NC program which corresponds to the NC program supplied to the numerical control unit 20, from the NC program stored in the buffers in the other communication units.

When a communication failure occurs or a long-term communication delay between the communication unit (for example, communication unit 40), which is used by the DNC operation management unit 30 to read the NC program, and the host 60, storing of the NC program in the buffer in the communication unit (40) using the communication path with the failure or delay is stopped, and the NC program in the buffer is exhausted if the machining operation is continued. Therefore, the DNC operation management unit 30 detects the fact that the buffer in the currently used communication unit (40) will be exhausted and switches the buffer from which the NC program is to be read, to the buffer in the other communication unit (50). In this way, the NC program is supplied from the DNC operation management unit 30 to the numerical control unit 20 even if a communication failure occurs, and the machining operation control of the machine tool continues without stop.

Figure 3:
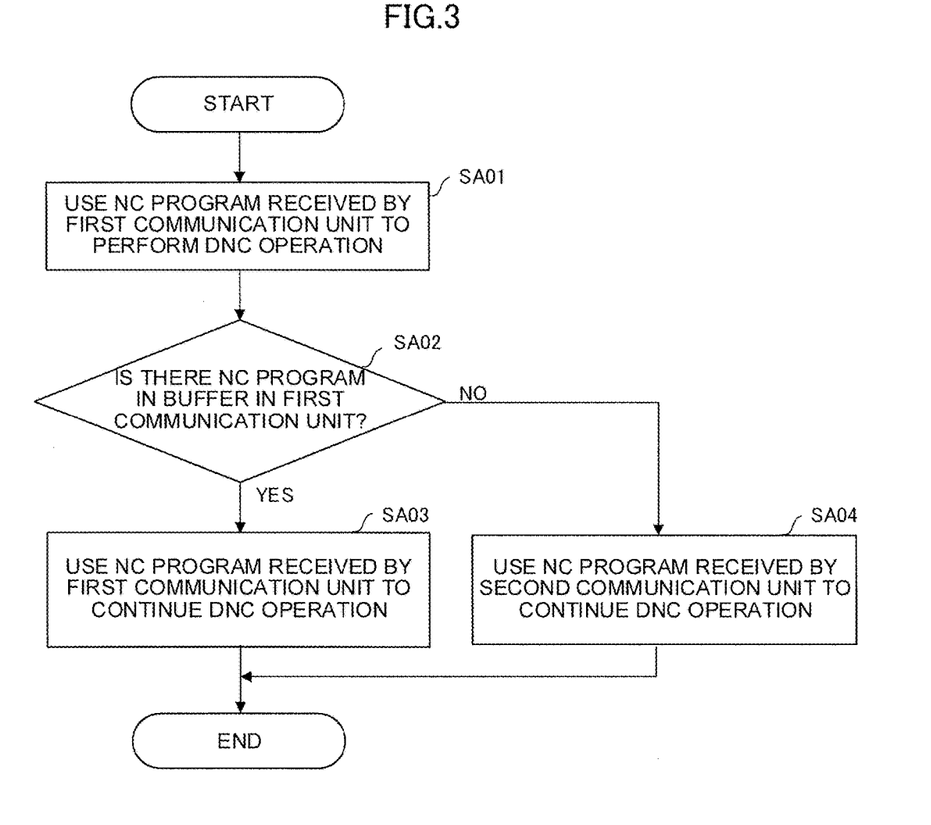
FIG. 3 is a flow chart showing a summary of the basic operation of the DNC operation described in FIG. 2 (operation of DNC operation management unit of FIG. 1)

FIG. 3 is a schematic flow chart of the basic operation of the DNC operation described in FIG. 2. The flow chart illustrates an example in which the first communication unit 40 is first used to start the DNC operation.

[Step SA01] The DNC operation management unit 30 supplies the NC program received by the first communication unit 40 to the numerical control unit 20 to start the DNC operation.

[Step SA02] The DNC operation management unit 30 determines the remaining amount of the NC program stored in the buffer in the first communication unit 40. If the NC program is remaining in the buffer, the DNC operation management unit 30 proceeds to step SA03, whereas if the NC program is not remaining, the DNC operation management unit 30 proceeds to step SA04.

[Step SA03] The DNC operation management unit 30 supplies the NC program received by the first communication unit 40 to the numerical control unit 20 and continues the DNC operation.

[Step SA04] The DNC operation management unit 30 switches the buffer to the buffer in the second communication unit 50 to supply the NC program received by the second communication unit 50 to the numerical control unit 20 and continues the DNC operation.

Hereinafter, the DNC operation by the numerical controller of FIG. 1 will be described in detail.

<Procedure 1: Start DNC Operation>

When an operator operates a control panel (not shown) of the numerical controller 10 to instruct the start of the DNC operation, the DNC operation calling unit 21 of the numerical control unit 20 requests the transmission management unit 31 of the DNC operation management unit 30 to acquire the NC program.

<Procedure 2: Request NC Program Acquisition>

The transmission management unit 31 requests the first NC program acquisition request transmission unit 41 in the first communication unit 40 and the second NC program acquisition request transmission unit 51 in the second communication unit 50 to acquire the NC program through the communication paths. The NC program acquisition request transmission units 41 and 51 that have received the requests request the same host 60 to acquire the NC program through the communication paths used by the NC program acquisition request transmission units 41 and 51. Any communication method, such as FTP protocol and HTTP protocol, that can receive the NC program can be used to acquire the NC program from the host 60, and the NC program acquisition request transmission units 41 and 51 may use different communication methods.

<Procedure 3: Receive NC Program>

The first and second NC program reception units 42 and 52 receive the NC program requested by the first and second NC program acquisition request transmission units 41 and 51 from the host 60, respectively. The NC program received by the first NC program reception unit 42 is stored in the first reception data buffer 43, and the NC program received by the second NC program reception unit 52 is stored in the second reception data buffer 53.

<Procedure 4: Monitor Reception Buffer>

The reception management unit 32 of the DNC operation management unit 30 monitors the amount of NC program stored in the first reception data buffer 43 and the second reception data buffer 53.

<Procedure 5: Start NC Program Supply>

When a "certain amount" of NC program is stored in the first reception data buffer 43, the reception management unit 32 starts to supply the NC program of the first reception data buffer 43 to the machining buffer 23 of the numerical control unit 20. The "certain amount" here may be a percentage (for example, 70%) of the total capacity of the first reception data buffer 43, and in this case, the "certain amount" may be arbitrarily determined from the size of the reception data buffer that can be reserved, expected speed of line, details of machining, and the like.

If more NC program is stored in the second reception data buffer 53 than in the first reception data buffer 43, the reception management unit 32 may supply the NC program from the second reception data buffer 53 to the machining buffer 23, instead of the first reception data buffer 43. In this case, the "first communication unit 40" (as well as the "first NC program acquisition request transmission unit 41", the "first NC program reception unit 42", and the "first reception data buffer 43") in the following description will be read as the "second communication unit 50" (as well as the "second NC program acquisition request transmission unit 51", the "second NC program reception unit 52", and the "second reception data buffer 53").

<Procedure 6: Discard NC Program>

After supplying the NC program of the first reception data buffer 43 to the machining buffer 23, the reception management unit 32 deletes the same amount of NC program from the second reception data buffer 53. In the deletion, the extent of the deletion of the NC program may be determined by using a block number and the like of the supplied NC program, in addition to the amount of NC program. If the part of the NC program to be deleted is not yet received by the second reception data buffer 53, an expected amount of deletion may be temporarily stored in a memory, and the part of the NC program may be deleted after the part is stored in the second reception data buffer 53.

<Procedure 7: Machining Operation>

The machining execution unit 22 of the numerical control unit 20 reads the NC program supplied from the machining buffer 23 to start the machining.

<Procedure 8: Continue Machining Operation>

When the communication is performed normally, the numerical control unit 20 keeps using the NC program stored in the first reception data buffer 43 to continue the machining.

<Procedure 9: Communication Failure>

When a communication failure occurs on the communication path between the first NC program reception unit 42 and the host 60, the supply of the NC program from the first NC program reception unit 42 to the first reception data buffer 43 is stopped.

<Procedure 10: Switch Reception Data Buffer>

When the supply of the NC program from the first NC program reception unit 42 is stopped, the NC program in the first reception data buffer 43 decreases every time the reception management unit 32 reads the NC program. The reception management unit 32 monitors the amount of NC program in the first reception data buffer 43 during the supply of the NC program from the first reception data buffer 43 to the machining buffer 23. Therefore, the reception management unit 32 detects the communication failure when the amount of NC program in the first reception data buffer 43 falls below a "certain amount". The "certain amount" here is an amount of NC program to be read by the reception management unit 32 from the first reception data buffer 43 at a time.

The reception management unit 32 that has detected the communication failure switches the supply source of the NC program from the first reception data buffer 43 to the second reception data buffer 53 and supplies the NC program to the machining buffer 23 from the second reception data buffer 53.

In this way, even if a communication failure occurs on the communication path between the first NC program reception unit 42 and the host 60, the NC program is continuously supplied to the second reception data buffer 53 as long as the communication path between the second NC program reception unit 52 and the host 60 is normal. Therefore, the reception management unit 32 can continue to supply the NC program to the machining buffer 23, and the machining execution unit 22 is not stopped.

Figure 4:
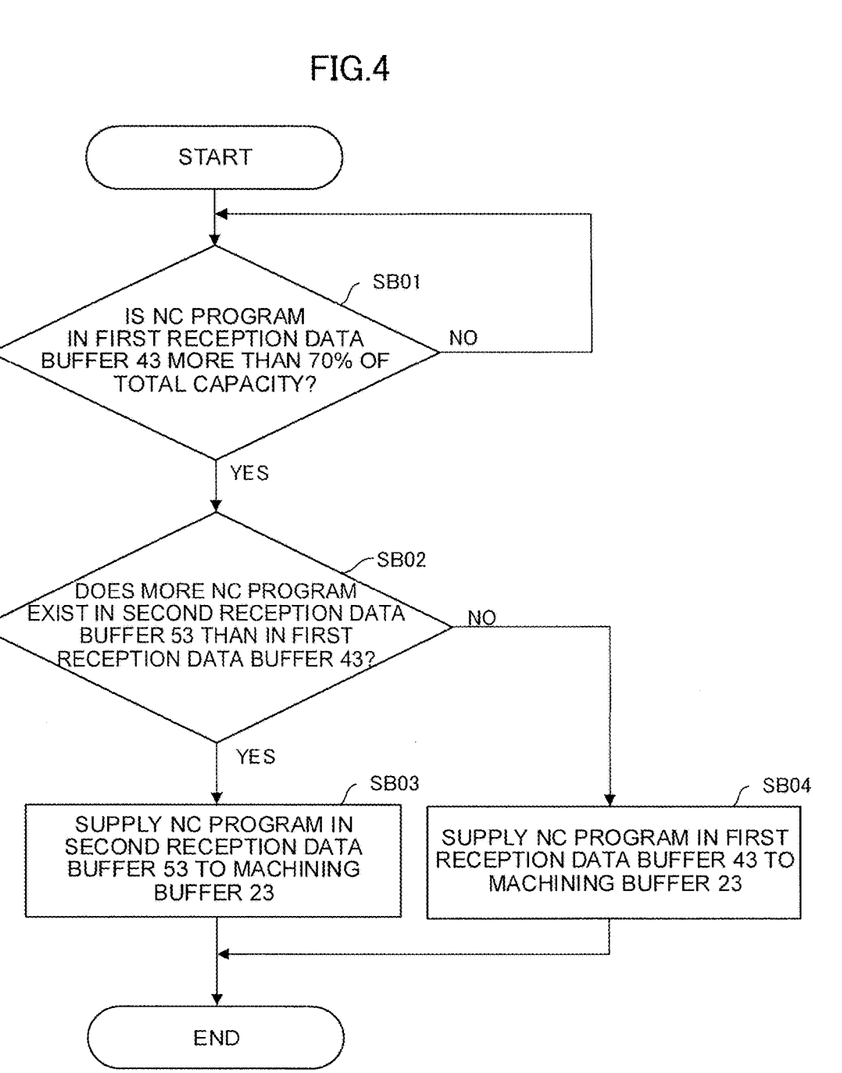
FIG. 4 is a flow chart showing a procedure of starting to supply an NC program in the DNC operation by the numerical controller (reception management unit) of FIG. 1.

FIG. 4 is a flow chart showing the procedure of "<Procedure 5: Start NC Program Supply>" described above.

[Step SB01] The reception management unit 32 determines whether or not the certain amount (for example, more than 70% of the buffer size) of NC program is stored in the first reception data buffer 43. If the certain amount of NC program is stored, the reception management unit 32 proceeds to step SB02, whereas if the certain amount of NC program is not stored yet, monitoring of the buffer is continued.

[Step SB02] The reception management unit 32 determines whether or not more NC program is stored in the second reception data buffer 53 than in the first reception data buffer 43. If more NC program is stored in the second reception data buffer 53 than in the first reception data buffer 43, the reception management unit 32 proceeds to step SB03, and otherwise, the reception management unit 32 proceeds to step SB04.

[Step SB03] The reception management unit 32 supplies the NC program in the second reception data buffer 53 to the machining buffer 23.

[Step SB04] The reception management unit 32 supplies the NC program in the first reception data buffer 43 to the machining buffer 23.

Figure 5:
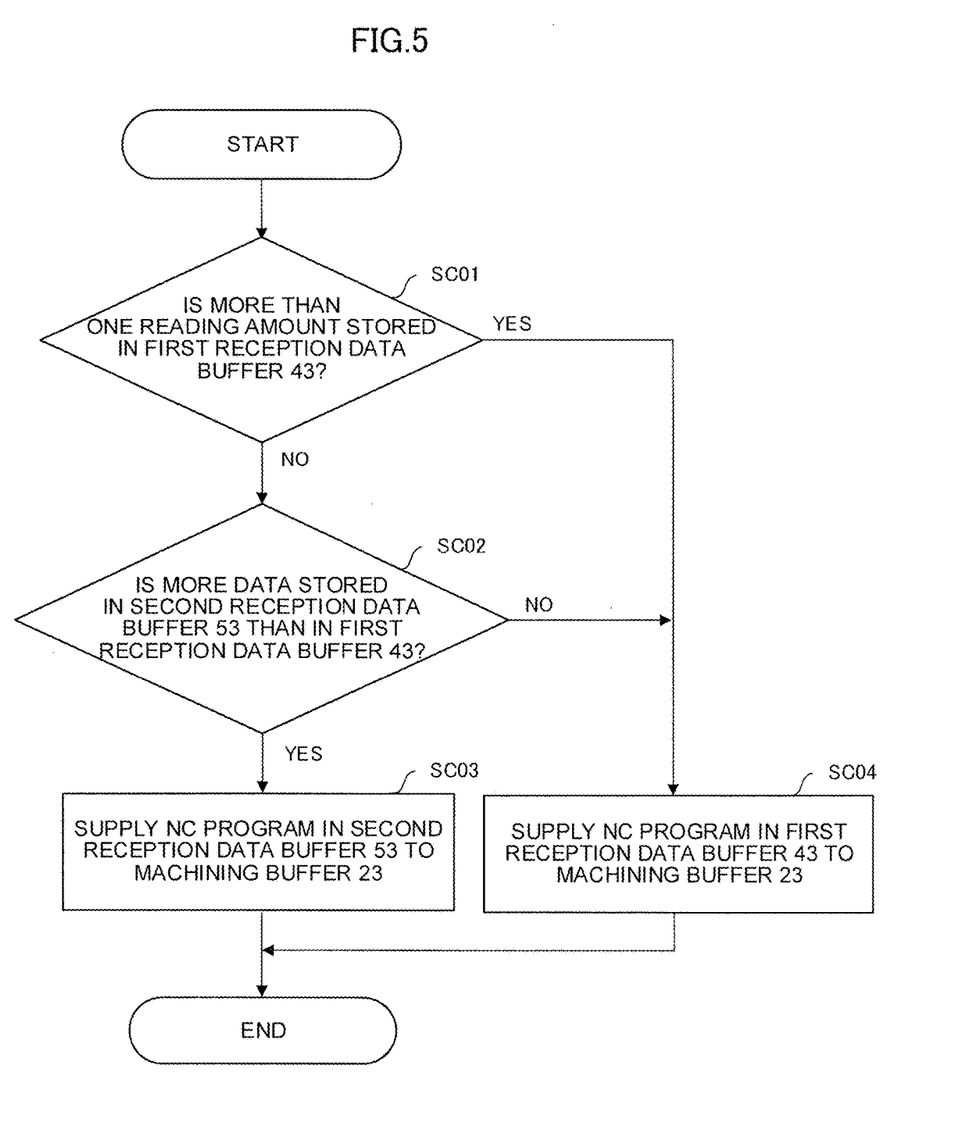
FIG. 5 is a flow chart showing a reception data buffer switching procedure by the numerical controller (reception management unit) of FIG. 1.

FIG. 5 is a flow chart showing the process of "<Procedure 10: Switch Reception Data Buffer>" described above.

[Step SC01] The reception management unit 32 determines whether or not more than one reading amount of NC program is stored in the first reception data buffer 43. If more than one reading amount of NC program is stored, the reception management unit 32 proceeds to step SC04, and otherwise, the reception management unit 32 proceeds to step SC02.

[Step SC02] The reception management unit 32 determines whether or not more NC program is stored in the second reception data buffer 53 than in the first reception data buffer 43. If more NC program is stored in the second reception data buffer 53 than in the first reception data buffer 43, the reception management unit 32 proceeds to step SC03, and otherwise, the reception management unit 32 proceeds to step SC04.

[Step SC03] The reception management unit 32 supplies the NC program in the second reception data buffer 53 to the machining buffer 23.

[Step SC04] The reception management unit 32 supplies the NC program in the first reception data buffer 43 to the machining buffer 23.

Although the first embodiment of the present invention has been described, the present invention is not limited to the example of the embodiments, and the present invention can be implemented in other modes by making appropriate changes. Some of the other embodiments will be illustrated below.

A second embodiment of the numerical controller according to the present invention will be described with reference to FIG. 6.

Figure 6:
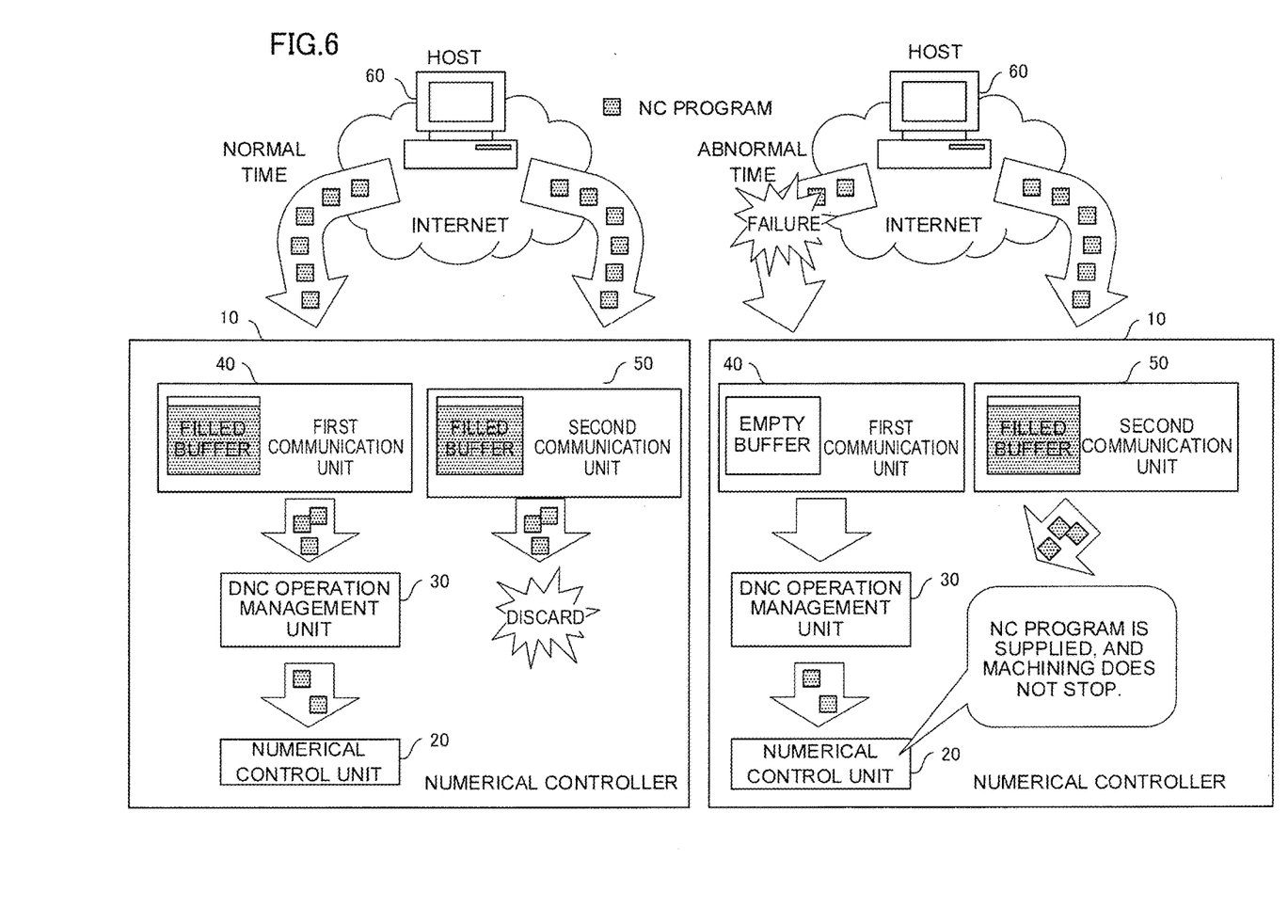
FIG. 6 is a diagram describing an outline of basic operation of DNC operation carried out on a second embodiment of the numerical controller according to the present invention.

FIG. 6 is a diagram describing an outline of basic operation of the DNC operation carried out on the numerical controller according to the present embodiment.

The numerical controller 10 is the same as the numerical controller 10 according to the first embodiment in that the numerical controller 10 includes the plurality of communication units 40 and 50 and that the same NC program is acquired from the host 60. The numerical controller 10 according to this embodiment is different from the numerical controller 10 according to the first embodiment in that the communication units 40 and 50 are connected to the host 60 through the Internet. In this case, Internet connection using a mobile phone network can be used as a communication line, in addition to wired communication lines, such as optical fiber cable, CATV, and ADSL. Even if the same type of communication line is used, ISP (Internet Service Provider) can be changed in each communication path to change the path of communication with the host 60 in each communication path.

The numerical controller 10 according to the present embodiment can have such a configuration. As a result, the NC program can be recorded in a host or a data center arranged in a center factory, and the DNC operation based on the NC program can be performed in a plurality of geographically dispersed factories. In this case, even if a failure occurs in a specific communication path or ISP, the NC program can be acquired through another communication path or ISP. Therefore, stable DNC operation can be continued.

A third embodiment of the numerical controller according to the present invention will be described with reference to FIG. 7.

Figure 7:
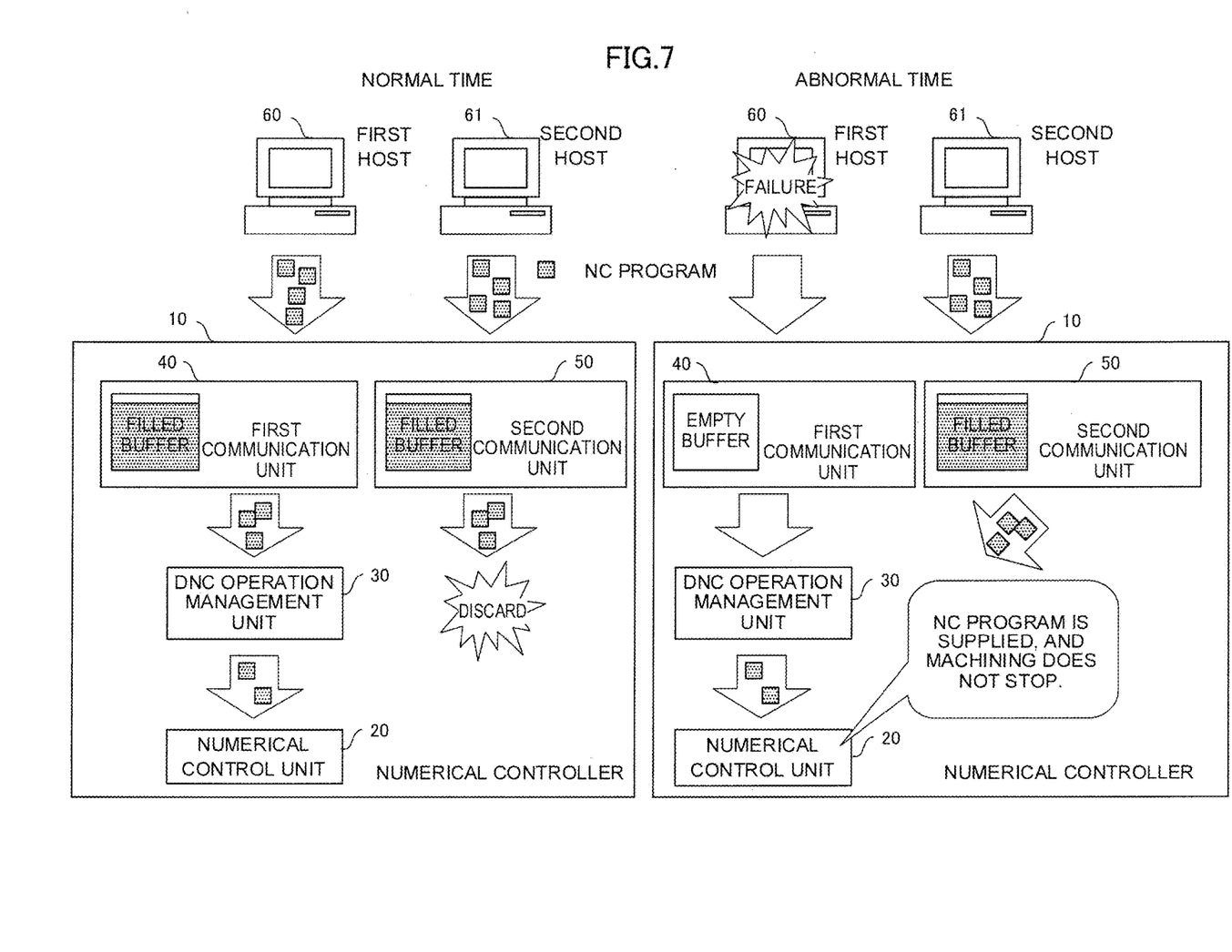
FIG. 7 is a diagram describing an outline of basic operation of DNC operation carried out on a third embodiment of the numerical controller according to the present invention.

FIG. 7 is a diagram describing an outline of basic operation of the DNC operation carried out on the numerical controller according to the present embodiment.

The numerical controller 10 according to the embodiment has the same configuration as the numerical controller 10 according to the first embodiment except that the host accessed by the plurality of communication units 40 and 50 (used by the communication units 40 and 50) is different in each communication path.

Hosts 60 and 61 accessed by the communication units 40 and 50 store and manage the same NC program and transmit the NC program in response to the NC program acquisition request from the numerical controller 10. The hosts 60 and 61 may exist on the same network as in the above first embodiment or may be connected through the Internet as in the second embodiment.

The numerical controller 10 may have a function of checking that the NC program stored in the buffer in one of the plurality of communication units (for example, first communication unit 40) and the NC program stored in the buffer in another one of the plurality of communication units (for example, second communication unit) are the same. Alternatively, an operator of the numerical controller 10 or an administrator of the host, instead of the numerical controller 10, may ensure that the NC programs are the same.

The numerical controller according to the third embodiment can have such a configuration. As a result, the cost of preparing a plurality of hosts and the cost of ensuring that the NC programs in the hosts are always the same are additionally needed. However, compared to the first and second embodiments, the communication paths can be more clearly separated, and a failure in the hosts can be evaded.

The numerical controller 10 includes two communication units, the first communication unit 40 and the second communication unit 50, in the configuration described above. However, the number of communication units is not limited to two, and three or more communication units may be provided.

Although the communication failure is detected by the exhaustion of the NC program stored in the reception data buffer of the communication unit being an acquisition destination of the NC program in the description above, the detection method of the communication failure is not limited to this. A unit that monitors the communication status of the communication path may be provided in each communication unit, and if a communication failure is detected, the unit may notify the DNC operation management unit 30 of the communication failure.

What is claimed is:

1. A numerical controller capable of DNC operation using an NC program acquired from a host through a communication path, the numerical controller comprising:
   a numerical control unit that controls a machine tool based on the NC program;
   a plurality of communication units that use different communication paths to receive the NC program; and
   a DNC operation management unit that supplies the NC program received by the communication units to the numerical control unit, wherein
   each of the plurality of communication units comprises:
      a reception data buffer that stores the NC program; and
      an NC program reception unit that receives the NC program from the host to store the NC program in the reception data buffer, wherein
   the DNC operation management unit
      acquires the NC program from the reception data buffer included in one of the plurality of communication units to supply the NC program to the numerical control unit and
      comprises a reception management unit that switches an acquisition destination of the NC program to the reception data buffer of another communication unit when a communication failure of the communication path used by the one of the plurality of communication units is detected, and wherein
   the reception management unit detects the communication failure of the communication path used by the communication unit based on a remaining amount of the NC program stored in the reception data buffer of the communication unit being an acquisition destination of the NC program.

2. The numerical controller according to claim 1, wherein at least one of the communication paths is configured to use the Internet.

3. The numerical controller according to claim 1, wherein the plurality of communication units receive the NC program from different hosts among at least two or more hosts.

4. The numerical controller according to claim 2, wherein the plurality of communication units receive the NC program from different hosts among at least two or more hosts.

* * * * *